UNITED STATES PATENT OFFICE.

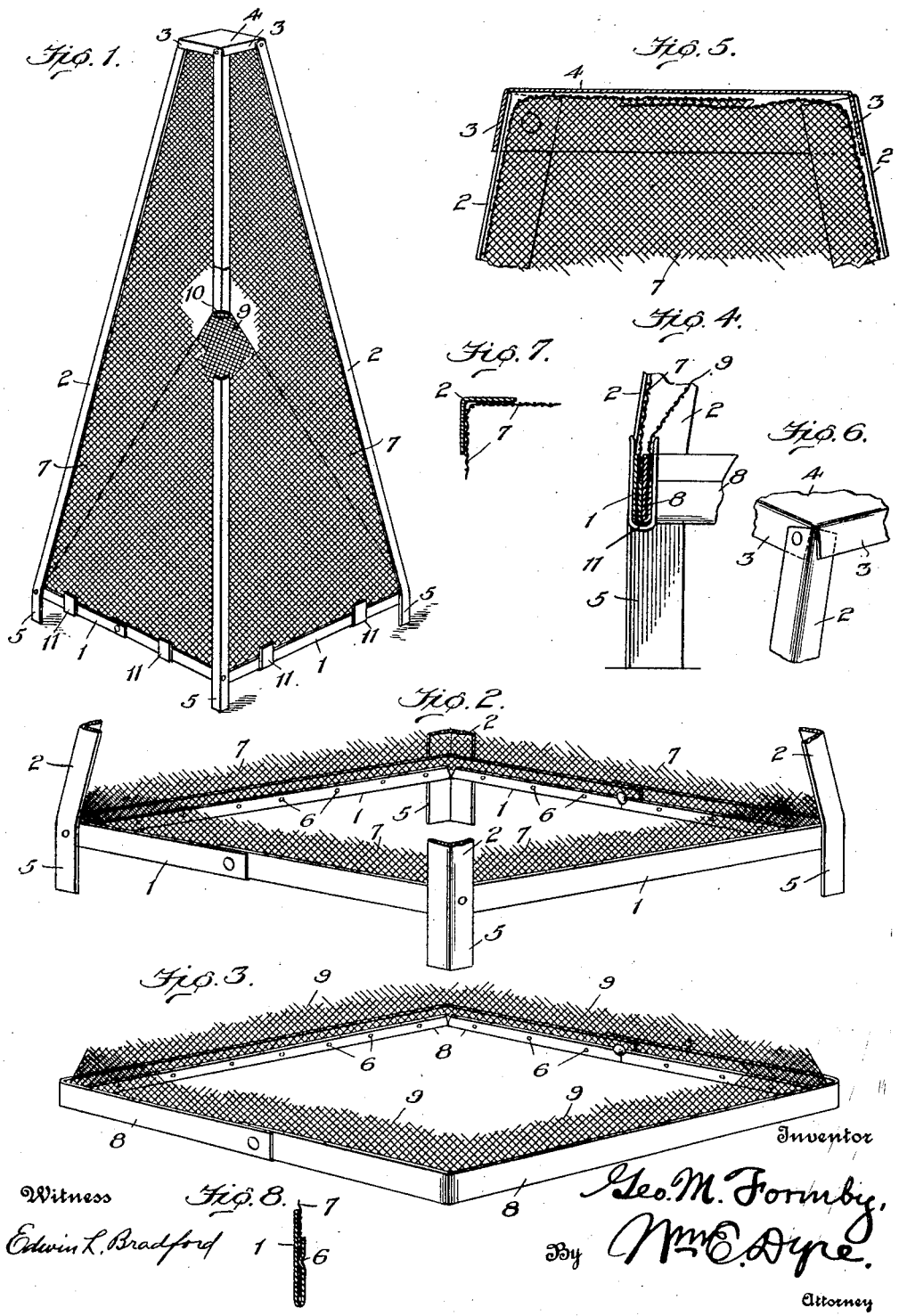

GEORGE M. FORMBY, OF DENTON, GEORGIA.

FLYCATCHER.

1,324,888.

Specification of Letters Patent.

Patented Dec. 16, 1919.

Application filed April 1, 1916. Serial No. 88,292.

*To all whom it may concern:*

Be it known that I, GEORGE M. FORMBY, a citizen of the United States, residing at Denton, in the county of Jeff Davis and State of Georgia, have invented certain new and useful Improvements in Flycatchers; and I do hereby declare the following to be a full, clear, and exact description of the invention, such as will enable others skilled in the art to which it appertains to make and use the same.

My invention relates to fishing and trapping, but more especially to insect catchers including fly traps of the cage type, and has for its primary object extermination of the ordinary dreaded house fly.

As a further object my invention contemplates the production of fly traps of great simplicity and durability. And, because of such simplicity, traps which are very economical of construction, easily assembled, and capable of being nested together most advantageously for purposes of shipment or storage.

A further object is the production of fly traps which are peculiarly efficient in the performance of their intended function, and readily emptied and cleaned.

With these and other objects and advantages in view the invention will now be particularly described, and then pointed out in the claim hereto appended.

In the accompanying drawings which form part of this application for Letters Patent, and whereon corresponding numerals indicate like parts in the several views:

Figure 1 is a perspective view of the invention completely assembled and ready for use, the same being broken away at one corner disclosing the conical inner cage leading into body of the trap or outer cage.

Fig. 2 is a fragmentary view, also in perspective, of the lower end of the body of trap.

Fig. 3 is a view corresponding with Fig. 2, but representing the bottom of the conical inner cage section or inlet of trap.

Fig. 4 is a fragmentary view showing in side elevation one supporting leg of the structure, and in section the telescoping base frames to which inner and outer wire screening material is secured, also one of several spring clips by which said base sections are detachably connected.

Fig. 5 is a fragmentary view consisting of a vertical section taken through the extreme upper end of the structure.

Fig. 6 is a detail view in perspective of one upper corner of the structure.

Fig. 7 is also a detail view showing in horizontal section one corner post, and

Fig. 8 is likewise a detail, being a vertical section through the main base frame of the structure showing one of numerous crimps, or indentations, which assist in retaining the wire in place.

Reference being had to the drawings and numerals thereon, 1 represents a rectangular base made of sheet metal, preferably galvanized iron, and folded upon itself as shown by Fig. 4. Rising from all four corners of said base are corresponding uprights 2, preferably of like material, and of angular cross-sectional form, as shown. These converge upwardly and are riveted at their upper ends to the down turned flanges 3 of a closed top 4. At their opposite or lower ends the said uprights 2 each project beyond the frame base 1 to form supporting legs 5 for the entire structure. While between the folds of said frame base 1 and there crimped securely in place by numerous indentations 6, as shown by Figs. 2, 3 and 8, is a single continuous piece of wire netting 7, preferably of rustless material, which in practice is creased and snugly fitted into the corners of uprights 2 as also within the flanges 3 of top 4, thus forming an outer cage, or the outer surrounding walls of a trap structure of substantially truncated cone shape.

The numeral 8 indicates a second rectangular frame base, also folded upon itself, as shown by Fig. 4, and as shown by said figure, arranged to fit snugly within the main frame base 1. In the folds of this secondary frame base 8 and there further secured by numerous indentations 6, is the lower edge of a conical inner cage, preferably of wire netting 9, as in the outer walls of the structure. This inner cage it will be noted is wide open at its bottom, but at its apex is provided with a restricted opening 10 serving as the only inlet to the interior of the outer cage.

As the means of quickly, effectually and detachably securing said main and secondary frame members 1 and 8 together in operative relation, U-shaped spring clips 11 are provided which are readily forced into place from below and caused to bind firmly upon opposite faces of said frame members, as shown by Figs. 1 and 4.

This being substantially the construction of my present invention in its preferred form of manufacture, it should be noted that same may be variously changed and modified in the matter of size, shape, proportions and materials employed without departing from the spirit of the invention.

The use and operation of the invention are quite obvious, and need not, therefore, be set forth in detail, but attention may be directed to a few of many practical advantages which have been found to result from the particular arrangement and combination of parts hereinbefore shown and described.

For instance, practical experience has shown that there is a natural tendency on the part of house flies to ascend, particularly after eating freely, and to seek the light at all times. This being so, the present invention is designed, arranged and adapted to utilize these traits of the house fly, and extensive use of the present invention has demonstrated that whether baited or not baited the trap is entered freely by flies whenever and wherever there may be flies to enter.

Entering between legs 5 beneath frame bases 1, 8, flies then observe the light above, practically unobstructed except by the wires 7 and 9 themselves, because of the exceedingly light skeleton framework by which such wires are supported. Rising toward the light above flies then naturally find a supposed outlet through the restricted opening 10 in the apex of the funnel-shaped inner cage 9, only to find themselves practically entrapped between the walls of the inner and outer cage members.

Under these conditions, flies have been found to accumulate very rapidly, and when necessary to remove them, or their dead bodies, the inner frame 8 is instantly released from the confines of outer frame base 1 by simply removing the spring clips 11. Thus also the parts may be conveniently dismembered for purposes of cleaning. And it should also be noted that the peculiar arrangement and combination of parts shown greatly facilitates nesting the several parts within like parts of other traps for purposes of storage or shipment.

It may be further noted by reference to the drawings, particularly Figs. 5, 7 and 4, that the woven fly-proof cage material 7 rises from base 1 and is fitted loosely within the confines of frame uprights 2, without being secured to said uprights; it will also be observed by reference to Figs. 1, 2, 3 and 5, that both the warp and weft strands of the wire fabric 7 are angularly arranged with relation to the longitudinal axis of the structure. As a result of this angular arrangement and unattached relation between the wire fabric 7 and corner uprights 2, the said material yields readily to pressure or exterior blows, which would otherwise rupture and render unserviceable the same if attached to uprights 2 in fixed relation. As a consequence the durability and efficiency of the present structure is greatly enhanced.

Having thus described my invention, what I now claim and desire to secure by Letters Patent is:

In a fly trap, the combination with a frame comprising an elevated, relatively stiff base and suitable uprights projecting above said base, of an outer cage open only at its bottom formed of fly-proof material rising from said base and fitted within the confines of said uprights, an inner upwardly converging removable cage having a base adapted to fit closely within the first mentioned base in parallel relation and provided with a constricted opening communicating with the interior of said outer cage, and spring clips having substantially parallel sides for detachably binding and securing said frame bases together.

In testimony whereof I affix my signature, in presence of two subscribing witnesses.

GEORGE M. FORMBY.

Witnesses:
A. J. ELLIS,
R. J. RODDENBERRY.